(12) United States Patent
Herth

(10) Patent No.: US 7,152,884 B2
(45) Date of Patent: Dec. 26, 2006

(54) CONDUIT BOX

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 124 days.

(21) Appl. No.: 10/859,757

(22) Filed: Jun. 3, 2004

(65) Prior Publication Data

US 2004/0245767 A1    Dec. 9, 2004

Related U.S. Application Data

(60) Provisional application No. 60/476,542, filed on Jun. 6, 2003.

(51) Int. Cl.
*F16L 3/00* (2006.01)
*E04C 2/52* (2006.01)
(52) U.S. Cl. .................. 285/64; 285/45; 285/154.1; 52/220.2; 52/220.8; 52/243.1
(58) Field of Classification Search ............... 285/45, 285/64, 154.1; 52/220.2, 220.8, 243.1
See application file for complete search history.

(56) References Cited

U.S. PATENT DOCUMENTS

| 185,075 | A | * | 12/1876 | Clapp et al. ............... 285/64 |
| 215,987 | A | * | 5/1879 | Spofford ..................... 285/64 |
| 453,485 | A | * | 6/1891 | Johnson ..................... 285/13 |
| 849,395 | A | * | 4/1907 | Hinsdill ..................... 220/3.2 |
| 2,146,067 | A | * | 2/1939 | Graham ..................... 285/373 |
| 2,216,873 | A | * | 10/1940 | Browne ..................... 454/183 |
| 2,982,103 | A | * | 5/1961 | Revesz et al. ............. 405/230 |
| 4,050,205 | A | * | 9/1977 | Ligda ......................... 52/357 |
| 4,086,736 | A | * | 5/1978 | Landrigan ................. 52/220.8 |
| 4,183,368 | A | * | 1/1980 | Husted ..................... 134/166 R |
| 4,842,227 | A | * | 6/1989 | Harrington et al. ........ 248/56 |
| 4,995,309 | A | * | 2/1991 | Weaver ..................... 454/354 |
| 5,526,619 | A | * | 6/1996 | Vagedes ..................... 52/220.1 |
| 5,813,178 | A | * | 9/1998 | Edwards ..................... 52/239 |
| 5,839,703 | A | * | 11/1998 | Tesar ......................... 248/65 |
| 5,957,503 | A | * | 9/1999 | Brown ....................... 285/13 |
| 6,176,057 | B1 | * | 1/2001 | Bouchet et al. ............. 52/514 |

* cited by examiner

Primary Examiner—James M. Hewitt
(74) Attorney, Agent, or Firm—Alfred M. Walker

(57) ABSTRACT

A weatherproof non corrosive, non-metallic conduit box molded preferably of a sturdy plastic material, such as, for example, polyvinyl chloride, which is a fire resistant and resilient material. The conduit box is ultraviolet (UV) resistant and has high tensile strength for good impact resistance. The conduit box is resistant to corrosion from water exposure and has high impact resistance, with resistance to cracking. The polyvinyl chloride pipes also resist acid rain, which reacts to accelerate corrosion of either the aluminum or the metallic fasteners used for attachment due to differences in contact potential.

4 Claims, 2 Drawing Sheets

CONDUIT BOX

RELATED APPLICATIONS

This application claims benefit under 35 USC 119(e) from provisional application No. 60/476,542, filed Jun. 6, 2003.

FIELD OF THE INVENTION

The present invention relates to non-corrosive, non-metallic sill plates, or conduit boxes, covering external building electrical wiring.

BACKGROUND OF THE INVENTION

Conduit boxes are used to attach electrical conduit to an exterior or interior surface of a building and to seal the wall penetrations while permitting access to the wiring.

These traditional conduit boxes are typically cast of aluminum or aluminum alloy. Such metals used will corrode from water exposure and have only limited impact resistance, with a tendency to crack. Being conductive, acid rain will react to accelerate corrosion of either the aluminum or the metallic fasteners used for attachment due to differences in contact potential.

In addition, rusting fastener screws accelerate oxidation and the rusting of aluminum or other metals.

Moreover, the joints between metal sill plates and plastic pipes joining to the metal conduit boxes are usually not in a water tight joint, since the materials don't fit together well.

OBJECTS OF THE INVENTION

It is therefore an object of the present invention to provide a weatherproof non-corrosive conduit box.

It is also an object of the present invention to provide a fire resistant and resilient conduit box.

It is another object of the present invention to provide a conduit box which is ultraviolet (UV) resistant and has high tensile strength for good impact resistance.

Other objects will become apparent from the following description of the present invention.

SUMMARY OF THE INVENTION

In keeping with these objects and others, which may become apparent, the present invention is a non corrosive, non-metallic conduit box cover for covering wiring at the end of a plastic pipe (such as a PVC pipe) used as a sleeve.

The present invention is therefore a weatherproof non corrosive, non-metallic conduit box molded preferably of a sturdy plastic material, such as, for example, polyvinyl chloride (PVC), such as sold under the tradename of PVC 1900, which is a fire resistant and resilient material. While inexpensive, this material is ultraviolet (UV) resistant and has high tensile strength for good impact resistance. This is an improvement over prior art aluminum or aluminum alloy conduit boxes which corrode from water exposure and have only limited impact resistance, with a tendency to crack. The polyvinyl chloride pipes also resist acid rain, which reacts to accelerate corrosion of either the aluminum or the metallic fasteners used for attachment due to differences in contact potential. Being non-conductive, PVC avoids such problems.

Several embodiments of non-corrosive, non-metallic conduit boxes are included in this invention. The first, for most typical applications, has preferably two mounting holes and uses a separate base gasket. The second embodiment, for heavy-duty use with large diameter conduit, has four mounting holes on its flange portion.

Other embodiments include non-corrosive, non-metallic electrical box covers mounted to building siding on an exterior of a building.

DESCRIPTION OF THE DRAWINGS

The present invention can best be understood in connection with the accompanying drawings. It is noted that the invention is not limited to the precise embodiments shown in drawings, in which:

FIG. 3 shows a side elevational view thereof, taken in the ellipse labeled "2, 3" in FIG. 1, wherein FIG. 3 shows an electrical wire therein;

DETAILED DESCRIPTION OF THE INVENTION

Figure 1:
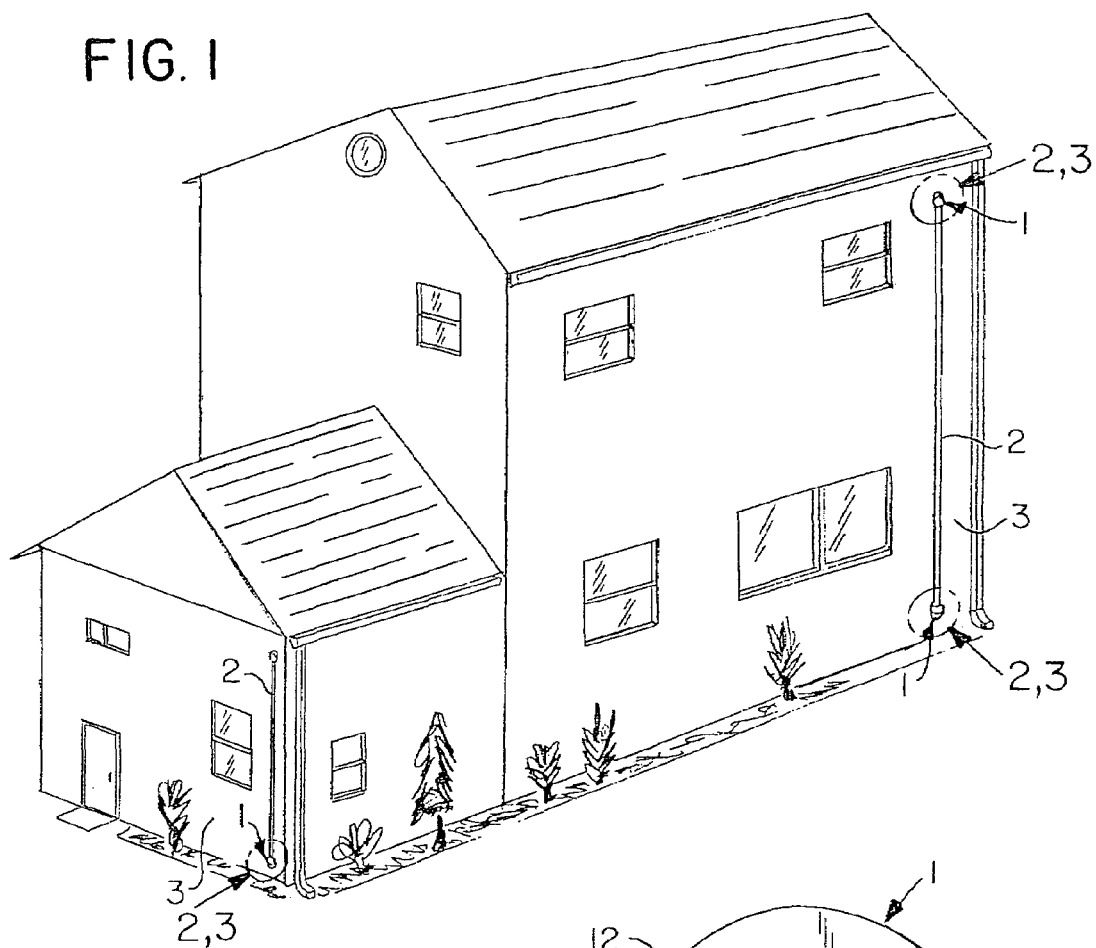
FIG. 1 is a perspective view of a typical installation of two non corrosive, non-metallic conduit boxes of this invention attached to a side wall of a building with conduit therebetween.

FIG. 1 is a perspective view of a typical installation of two non corrosive, non-metallic conduit boxes 1 of this invention attached to a side wall 3 of a building with conduit therebetween.

Figure 2:
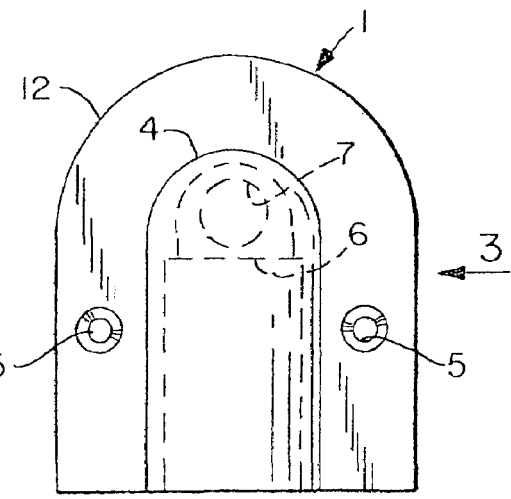
FIG. 2 shows a front elevational view of the conduit box of the present invention.
Figure 3:
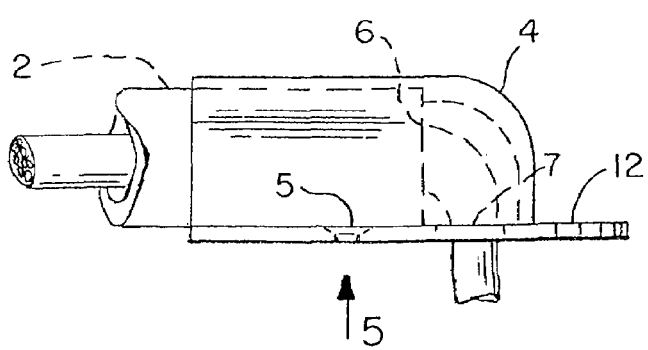
Figure 4:
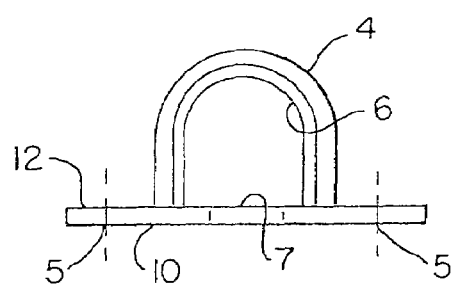
FIG. 4 shows an open bottom view thereof.

FIG. 2 shows a front view of the conduit box of the present invention, while FIG. 3 shows a side view, and FIG. 4 shows an open bottom view of sill plate 1. The domed end and arched central portion 4 is surrounded by flange 12 with two mounting holes 5. Internal shoulder 6 is a stop for conduit pipe 2 while the wires exit the domed end portion at the bottom. A resilient mounting gasket 10 is used on the bottom; it has exit hole 7 for the wiring.

Figure 5:
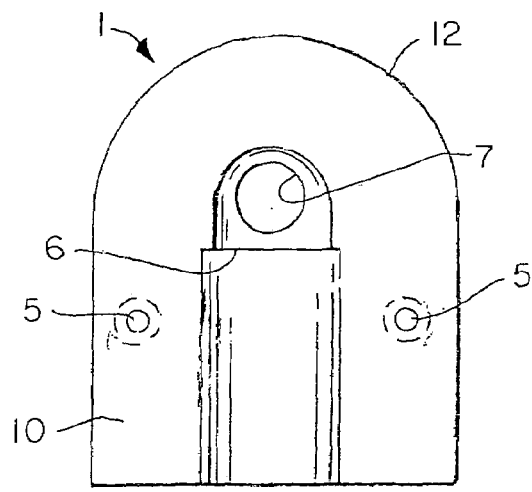
FIG. 5 is a rear view thereof.

This can best be seen in the rear view of FIG. 5. Gasket 10 can be fabricated from materials including impregnated felt, synthetic rubber, polyurethane, or silicone. It is either field installed or attached to the bottom of conduit box 1 at the factory. A field applied cement or sealant such as silicone seals conduit 2 to conduit box 1.

Figure 6:
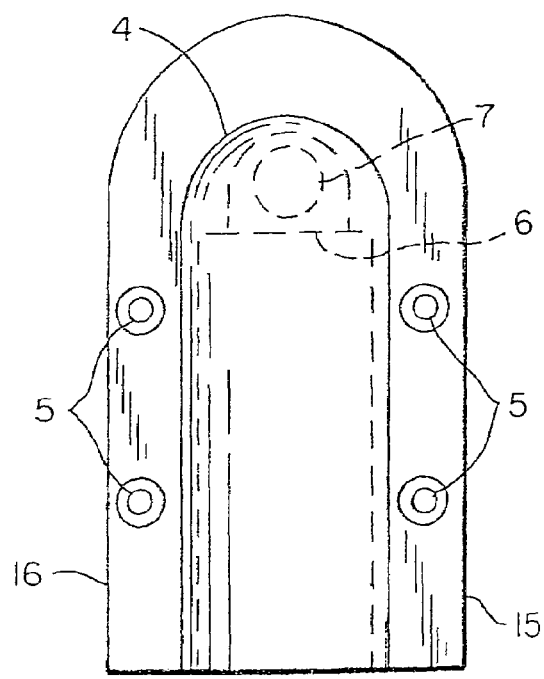
FIG. 6 is a front elevational view of an alternate embodiment with multiple pairs of connector holes; and, FIG. 7 is a rear view thereof.
Figure 7:
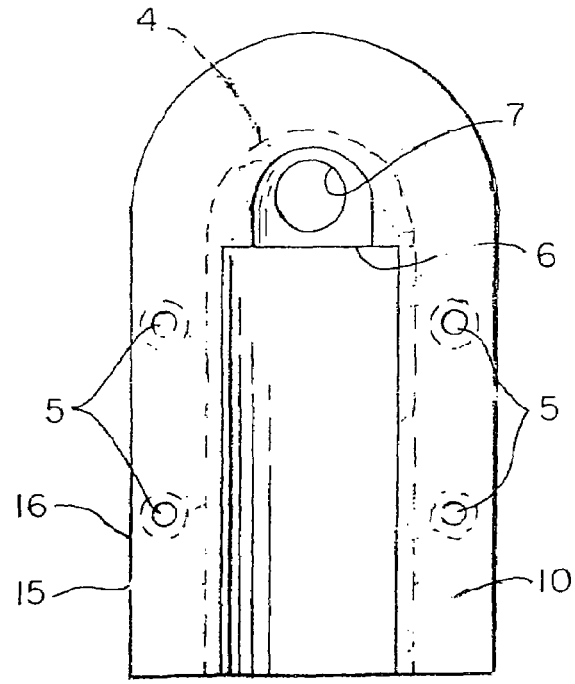

A second embodiment of this invention is conduit box 15 shown in the front elevational view of FIGS. 6 and 7. It is also preferably molded of a polyvinyl chloride material, such as PVC 1900, and is intended for use with a larger conduit. It is sized appropriately and has four mounting holes 5 on flange portion 16. The greater number of fasteners better accommodate the increased weight of the larger conduit with larger gauge wiring.

The embodiment shown in FIGS. 6 and 7, the domed end and arched central portion 4 is also surrounded by flange 16 with two pairs of mounting holes 5. Internal shoulder 6 is also a stop for conduit pipe 2 while the wires also exit the domed end portion at the bottom. A resilient mounting gasket 10 is also used on the bottom and the conduit box also has exit hole 7 for the wiring.

This can best be seen in the rear view of FIG. 7. Gasket 10 can also be fabricated from materials including impregnated felt, synthetic rubber, polyurethane, or silicone. In FIGS. 6 and 7, it is also either field installed or attached to the bottom of conduit box 1 at the factory. A field applied cement or sealant such as silicone also seals conduit 2 to sill plate 1 of FIGS. 6 and 7.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. A non-corrosive, non-metallic conduit box attached at a rear edge thereof to a side wall of a building, the conduit box comprising:
   a body having a recess along said rear edge, said recess accommodating a conduit holding electrical wire therein, said body being made of a fire resistant, water resistant, acid rain resistant and ultraviolet resistant plastic;
   said body having an opening at a first end to receive the electrical wire conduit into said recess and a blocked second end, said recess being shaped to fit tightly against an outer surface of said conduit between said shoulder and said first end;
   an internal shoulder within said recess being a stop for said conduit, said electrical wire extending past said shoulder and out said recess through said side wall of said building; and,
   a flange extending alone and from sides of said recess for securing said conduit box to said outer surface of said side wall of said building.

2. The non-corrosive, non-metallic conduit box as in claim 1 wherein said plastic is polyvinyl chloride.

3. A non-corrosive, non-metallic conduit box attached at a rear edge thereof to an outer surface of a side wall of a building, the conduit box having a conduit holding an electrical wire therein and comprising:
   a body having a recess along said rear edge, said recess accommodating the conduit therein in a tight fit, said body being made of a fire resistant, water resistant, acid rain resistant and ultraviolet resistant plastic;
   said body having an opening at a first end to receive said conduit into said recess and a domed closed second end;
   an internal shoulder within said recess adjacent said domed end forming a stop for the conduit, an arched inner surface of said recess forming a tight fit with said conduit between said internal shoulder and said first end of said body wherein the wire exits said domed end into and through said side wall of said building;
   a flange extending from sides of said recess for securing said conduit box to said outer surface of said side wall of said building; and
   a resilient mounting gasket located along said flange in contact with said outer surface of said side wall of said building.

4. The non-corrosive, non-metallic conduit box as in claim 3 wherein said plastic is polyvinyl chloride.

* * * * *